United States Patent
Katayama

(10) Patent No.: US 6,805,997 B1
(45) Date of Patent: Oct. 19, 2004

(54) BATTERY

(75) Inventor: Hitoshi Katayama, Kanagawa (JP)

(73) Assignee: I·D·X Company Ltd., Kawasaki (JP)

( * ) Notice: Subject to any disclaimer, the term of this patent is extended or adjusted under 35 U.S.C. 154(b) by 0 days.

(21) Appl. No.: 09/889,168

(22) PCT Filed: Mar. 27, 2000

(86) PCT No.: PCT/JP00/01859

§ 371 (c)(1), (2), (4) Date: Jul. 11, 2001

(87) PCT Pub. No.: WO01/73869

PCT Pub. Date: Oct. 4, 2001

(51) Int. Cl.$^7$ ............................................... H01M 10/38
(52) U.S. Cl. ..................................................... 429/123
(58) Field of Search ............................. 429/96, 97, 99, 429/100, 123

(56) References Cited

FOREIGN PATENT DOCUMENTS

| JP | U 60-150771 | 10/1985 |
|---|---|---|
| JP | U 63-32458 | 3/1988 |
| JP | U 63-32459 | 3/1988 |
| JP | 6-104814 | 4/1994 |
| JP | 7-143372 A | 6/1995 |
| JP | 9-35762 | 2/1997 |
| JP | 11-174135 | 7/1999 |
| JP | 11-191854 | 7/1999 |

*Primary Examiner*—Gregg Cantelmo
(74) *Attorney, Agent, or Firm*—Kubovcik & Kubovcik

(57) ABSTRACT

In order to provide a battery capable of simultaneously mounting and using plural batteries without requiring the extra structure body such as a box-shaped holder, the center portion of a rear cover 10 constructing the battery is recessed and on the top of its recess part 15, a substantially V-shaped fitting plate 16 with a dovetail shape for mounting by a fitting structure of a dovetail joint to an adapter plate mounted in a video camera is fixed. In a top cover 11, portions substantially corresponding to the recess part 15 of the rear cover 10 are protruded, and a substantially V-shaped recess groove 22a with a shape in which protrusion parts 22, 22 correspond to the fitting plate 16 is formed.

2 Claims, 10 Drawing Sheets

(A)

(B)

BATTERY

BACKGROUND OF THE INVENTION

1. Field of the Invention

The present invention relates to a battery removably mounted on a video camera etc. and, more particularly to a battery used and mounted in the rear side of large-size equipment such as a video camera for commercial use.

2. Description of Related Art

In a large-size camera referred to as a camera for commercial use or for professional use, as shown in FIG. 1A, an adapter plate 3 is mounted in the rear side (the side opposite to a lens 2, and hereinafter described in like manner) of a video camera 1. A battery 4 is mounted directly in this adapter plate 3, or as shown in FIG. 1B, a box-shaped holder 5 is mounted in an adapter plate 3 and one or two battery 4 is inserted in this holder 5.

In the case of an example shown in FIG. 1A in which a detailed illustration is omitted, the adapter plate 3 is mounted in a vertical coupling surface 6 which is a back end of the video camera 1 by fitting a V-shaped engagement part into a V-shaped receiving groove in a dovetail joint manner. This joint structure is shown in, for example, Japanese Unexamined Patent Publication No. 7-143372. A mounting structure adapted for a mounting structure of the battery 4 is provided in a battery-mounting surface of the adapter plate 3. The structure is directed outward when mounted on the video camera 1. Thus, in such the structure, when a residual capacity of the battery 4 becomes a predetermined value or less, such the battery 4 shall be removed and a new battery is mounted required to use. Also, in the case of an example shown in FIG. 1B in which a detailed illustration is also omitted, the same mounting structure as that of the battery is provided in a mounting surface to the adapter plate 3 of the holder 5. In the case of this example, one of the battery 4 whose residual capacity lowers the predetermined value are removed from the holder 5 then a new battery is mounted and used.

Any of these mounting structures of the battery are convenient, but in the case of the example shown in FIG. 1A, plural batteries cannot naturally be mounted and used at the same time. In the case of the example shown in FIG. 1B, the extra structure body such as a box-shaped holder is also required though two batteries can be mounted and used at the same time.

Therefore, an object of the present invention is to provide a battery capable of simultaneously mounting and using plural batteries without requiring the extra structure body such as a holder.

SUMMARY OF THE INVENTION

In order to achieve the above object, a battery according to the present invention is characterized by a battery capable of being mounted removable in a coupling surface of a video camera etc. or an adapter plate mounted in said coupling surface, characterized in that in the battery provided with a V-shaped engagement part for fitting into a V-shaped receiving groove provided in the coupling surface of the video camera etc. or the adapter plate in a dovetail joint manner on one side, a V-shaped receiving groove with the same shape as that of the V-shaped receiving groove provided in the coupling surface of the video camera etc. or the adapter plate is provided on the other side opposite to one side of the battery to be mounted in the video camera etc. in order to join another battery having the V-shaped engagement part in a dovetail joint manner. Thus, the battery can easily be mounted in the video camera or the adapter plate mounted in the video camera and also, plural batteries can simultaneously be used by overlapping and mounting the battery in another battery in a state of being mounted in the video camera etc. and the need for the extra structure body such as a box-shaped holder is eliminated.

Also, in order to achieve the above object, a battery according to the present invention is characterized in that a circuit for outputting a self-capacitance, a terminal for inputting a self-capacitance output from another battery, and an averaging circuit for averaging an output of the self-capacitance output circuit and an input from the input terminal to produce an output are built into the battery. Thus, when plural batteries are simultaneously used, two batteries can integrally be handled to output the residual capacity.

Further, in order to achieve the above object, a battery according to the present invention is characterized in that a V-shaped receiving groove provided on the other side opposite to one side of the battery to be mounted in the video camera etc. is formed between a pair of protrusion parts protruded from the other side, and projections having a terminal for connection to another battery or another device capable of fitting in an equivalent dovetail joint manner on the top and projections for connection guide are provided on the upper parts of a pair of said protrusion parts, respectively, and another terminal for connection to another device is placed between these projections. Thus, in addition to mounting into the video camera, connection or disconnection between the batteries can be made very easily.

DETAILED DESCRIPTION OF THE PREFERRED EMBODIMENTS

An embodiment of the present invention will be described below with reference to the accompanying drawings.

Incidentally, common signs are attached to parts common to conventional parts and overlapping descriptions are omitted below.

Figure 1:
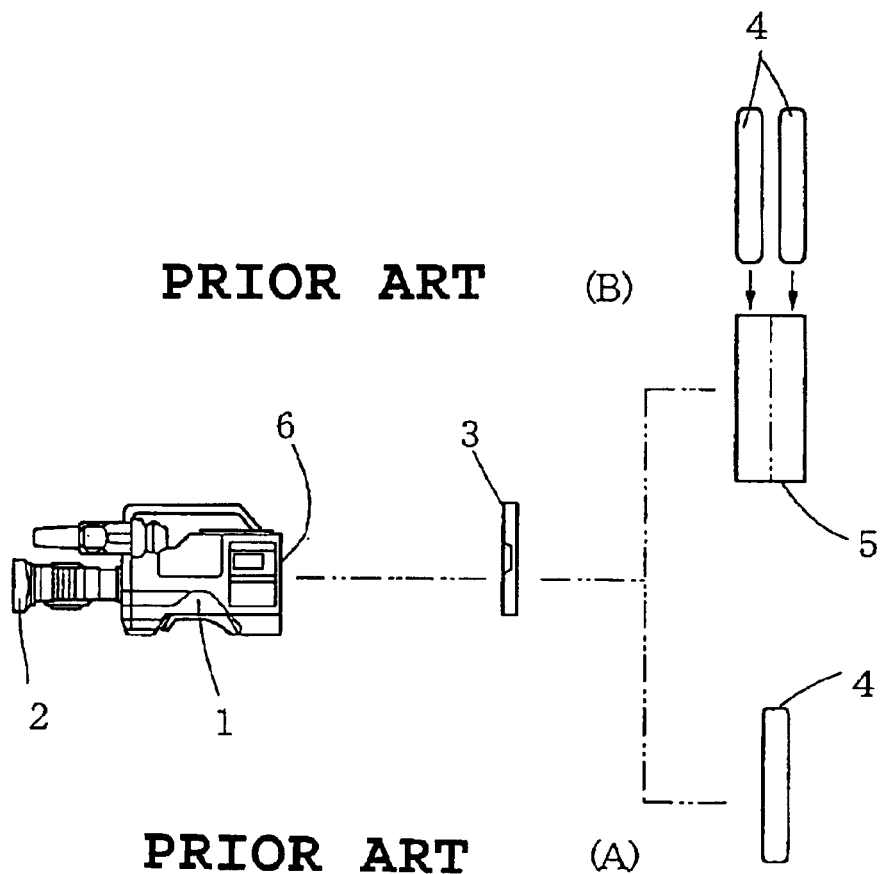
FIG. 1 is a schematic diagram showing a conventional mounting structure of a battery to a video camera.
Figure 2:
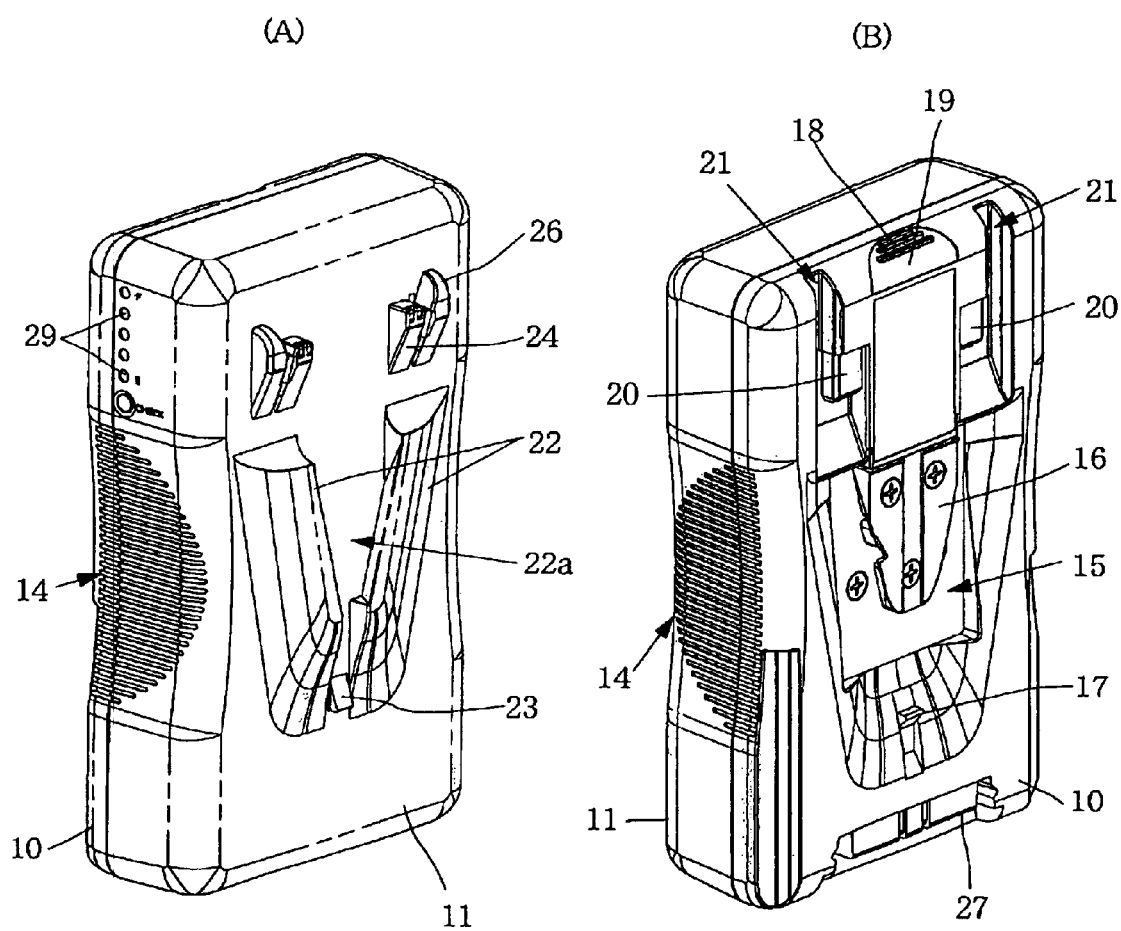
FIG. 2 is a perspective view of the front side (A) and a perspective view of the rear side (B) showing one embodiment of a battery according to the present invention.
Figure 3:
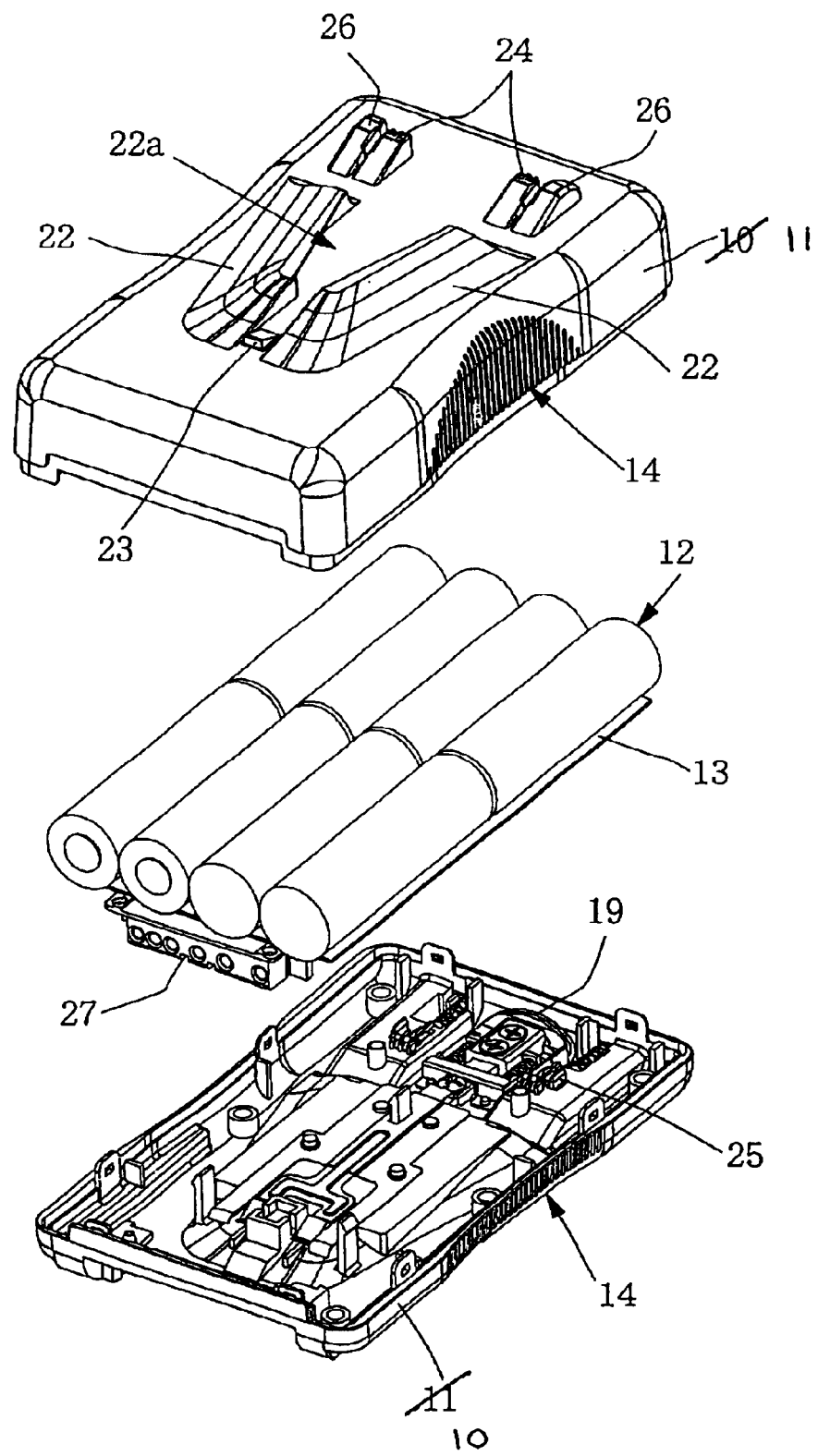
FIG. 3 is an exploded view seen from the front side of the battery.
Figure 4:
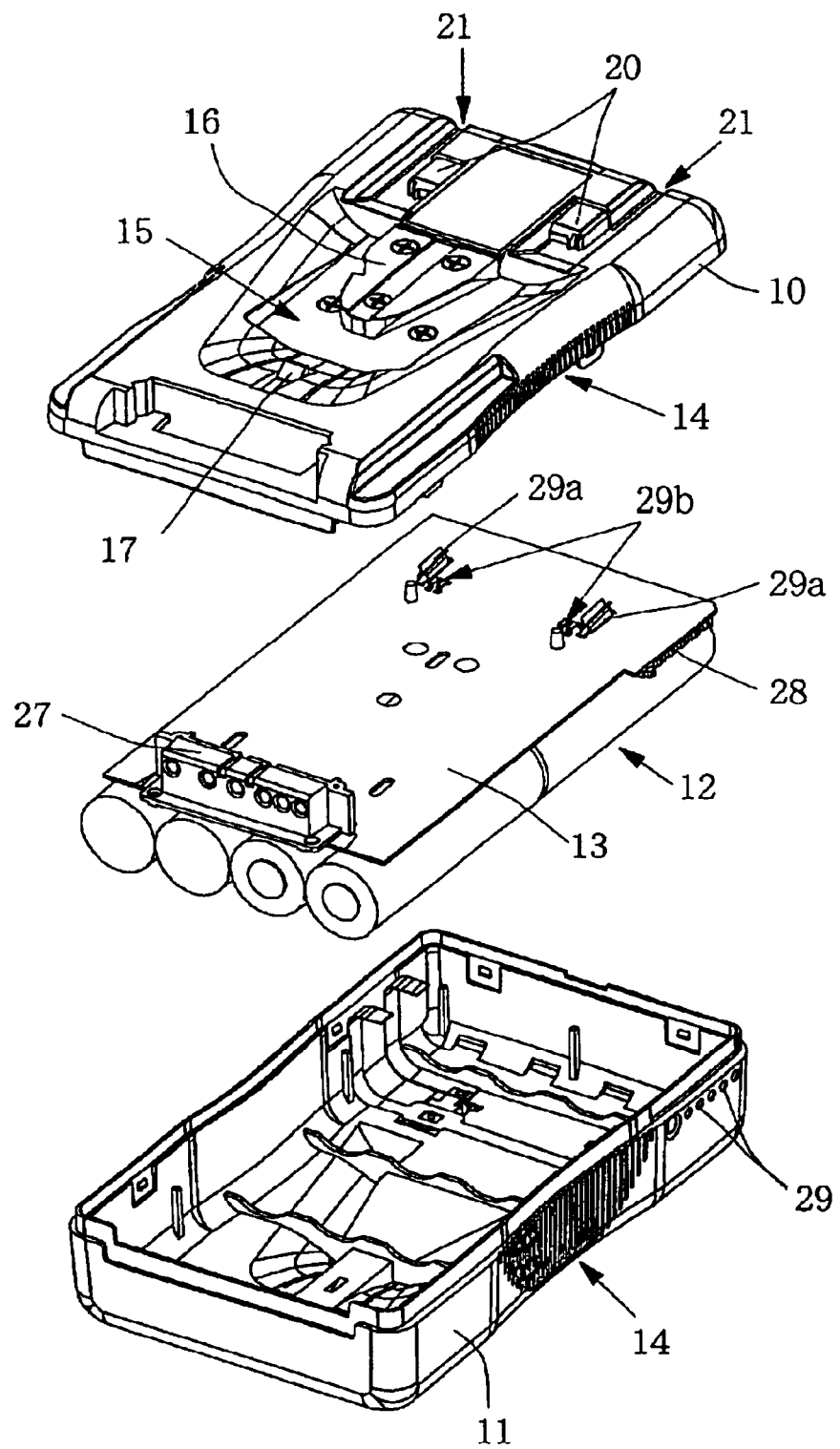
FIG. 4 is an exploded view seen from the rear side of the battery.

FIG. 2A is a perspective view of the front side and FIG. 2B is a perspective view of the rear side both for showing one embodiment of a battery according to the present invention, and FIG. 3 is an exploded view seen from the front side of the battery, and FIG. 4 is an exploded view seen from the rear side of the battery. The battery of the present embodiment mainly comprises a rear cover 10, a top cover 11, a battery pack 12 and a substrate 13, and non-slip parts for handhold are formed by respectively depressing side surfaces of the top cover 11 and the rear cover 10 smoothly somewhat and horizontally providing plural uneven parts 14 on the depressed portions. That is, in this battery, mounting and dismounting to a video camera etc. are performed in a vertical direction in FIG. 1 while the uneven parts 14 are horizontally provided to so as to become perpendicular to this mounting and dismounting direction.

The rear cover 10 recesses the center portion and on the top of its recess part 15, a substantially V-shaped fitting plate 16 with a dovetail shape for mounting by a fitting structure of a dovetail joint to an adapter plate mounted in a video camera is fixed. In addition, in the rear cover 10, the end of a protrusion part 17 for release peeps through the bottom of the recess part 15. Further, a release button 19 with a non-slip part 18 and slide covers 20, 20 covering terminals for electrical connection to the adapter plate mounted in the video camera are provided on the top of the rear cover 10. Furthermore, guide grooves 21, 21 are formed in outside positions of the slide covers 20, 20. In the top cover 11, portions substantially corresponding to the recess part 15 of the rear cover 10 are protruded, and a substantially V-shaped recess groove 22a with a shape in which these protrusion parts 22 correspond to the fitting plate 16 is formed. In addition, at the lowest portion of the groove 22a, a protrusion part 23 is provided and, in the upper portion of the groove 22a, guide projections 26, 26 are provided. The projections 26, 26 provided. The projections 26, 26 sandwich signal terminal parts 24, 24 and a power terminal (a portion passed through the internal side of the rear cover 10 is shown by numeral 25) between the signal terminal parts 24 and can be inserted into the guide grooves 21, 21 of the rear cover 10.

Incidentally, the bottom of the rear cover 10 has an opening and it is constructed so that a terminal part 27 of the substrate 13 equipped with the battery pack 12 for gathering plural batteries peeps from the opening to the outside. The terminal part 27 includes a charge terminal, a discharge terminal, an analog output, a digital data input terminal, a clock terminal, an earth terminal and so on. Further, plural holes 29 for being able to visually identify a display lamp part 28 of the substrate 13 equipped with the battery pack 12 from the outside are provided in the side surface of one side of the top cover 11. Furthermore, numerals 29a in FIG. 4 show power terminals provided in the substrate 13, and numerals 29b show terminals for an analog output or a clock.

Figure 5:
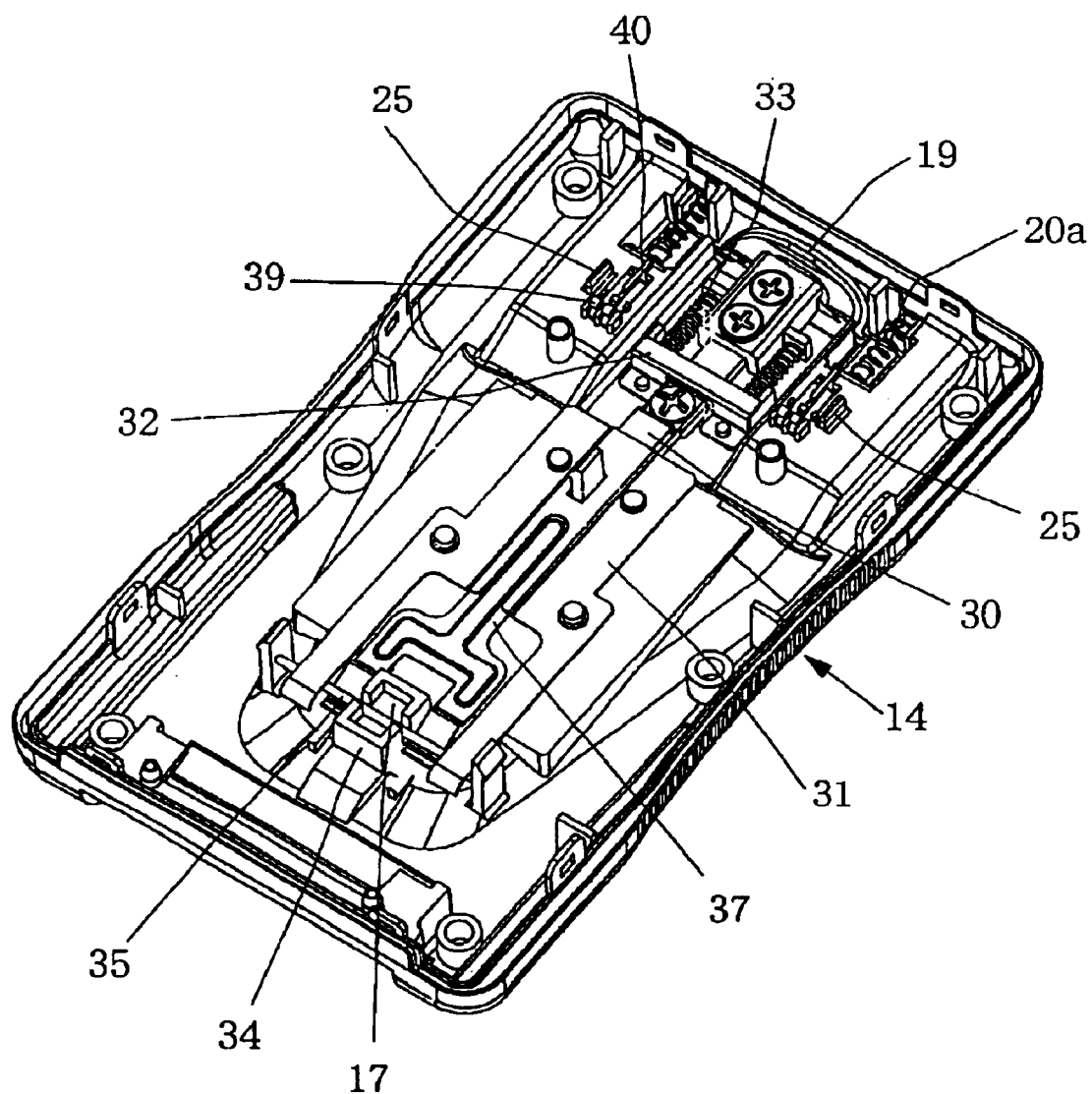
FIG. 5 is a perspective view seen from the upper side further in FIG. 3 showing an internal structure of a rear cover of the battery.
Figure 6:
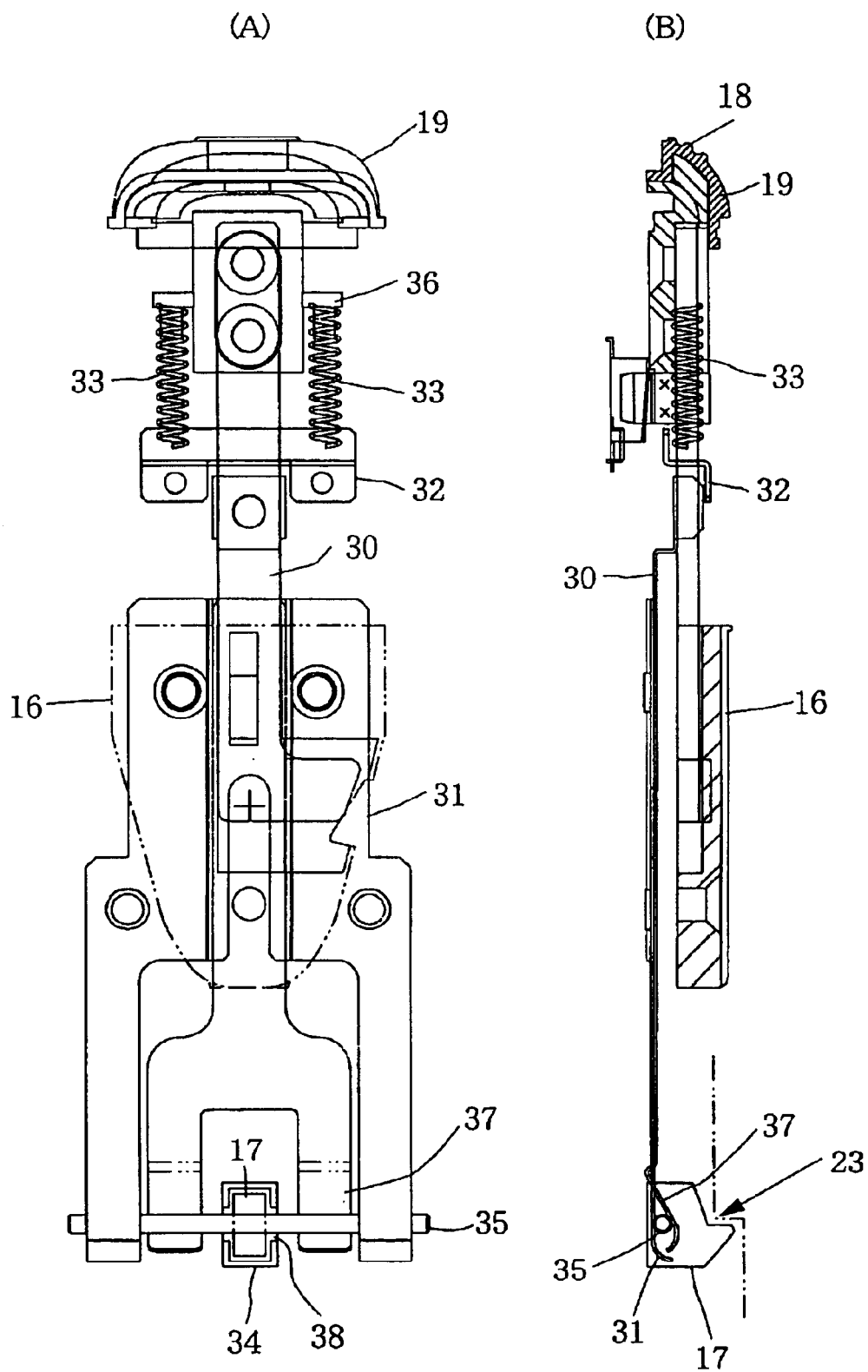
FIG. 6 is a rear view (A) and a sectional view (B) showing a removable structure provided in the rear cover.

FIG. 5 is a perspective view seen from the upper side further in FIG. 3 showing an internal structure of the rear cover 10, and FIG. 6A is a rear view and FIG. 6B is a sectional view both for showing a removable structure provided in the rear cover 10. This structure mainly comprises a movable member 30 whose top is covered with the release button 19, a spring plate 31 fixed in the inside of the rear cover 10, a spring receiving part 32 fixed in the inside of the rear cover 10 similarly, a pair of coil springs 33 and 33, a holding member 34 fastened in the internal side of the rear cover 10 in order to movably hold the protrusion part 17 for release movably mounted in an opening of the release button 19 in a back and forth direction, and a pin 35 which extends through the protrusion part 17 for release and is supported by the holding member 34. In the coil spring 33, its bottom is fixed in the spring receiving part 32 and its top is fixed in a spring receiving part 36 of the movable member 30, and the movable member 30 and the release button 19 are upwardly pushed and energized.

In the movable member 30, its bottom part is constructed of a leaf spring material 37, and the vicinity of the bottom part of this leaf spring material 37 is bent and formed as well seen from FIG. 6B. Then, it is constructed so that the pin 35 fitted into an elongated groove 38 of a back and forth direction provided in the holding member 34 is sandwiched by the bottom part of the leaf spring material 37 and the bottom part of the spring plate 31 and the protrusion part 17 for release is movably held in a direction along the elongated groove 38 and also the protrusion part 17 for release does not drop off the rear cover 10.

That is, in this structure, when the release button 19 is pushed down against an tenderization force of the coil springs 33, the movable member 30 is also pushed down and a slant surface of the bent portion of the bottom part of the leaf spring material 37 pushes the pin 35 toward the inside of the rear cover 10. The pin 35 moves toward the inside of the rear cover 10 within the elongated groove 38 of the holding member 34 along with the protrusion part 17 for release, and the protrusion part 17 for release breaks off an engagement part to the adapter plate mounted in the video camera or a protrusion part 23 for engagement provided in the top cover 11 of a battery with the same structure as that of the battery shown in the drawing, and when the whole battery is lifted upward, the fitting plate 16 can be removed from the adapter plate or other battery.

Incidentally, numeral 39 in FIG. 5 is a terminal for making contact with the terminal 29b for an analog output or a clock of the substrate 13, and numeral 40 is an insulating member for insulating two terminals 39, 39. In addition, numeral 20a is a spring for protrusive tenderizing the slide covers 20 downward.

Figure 7:
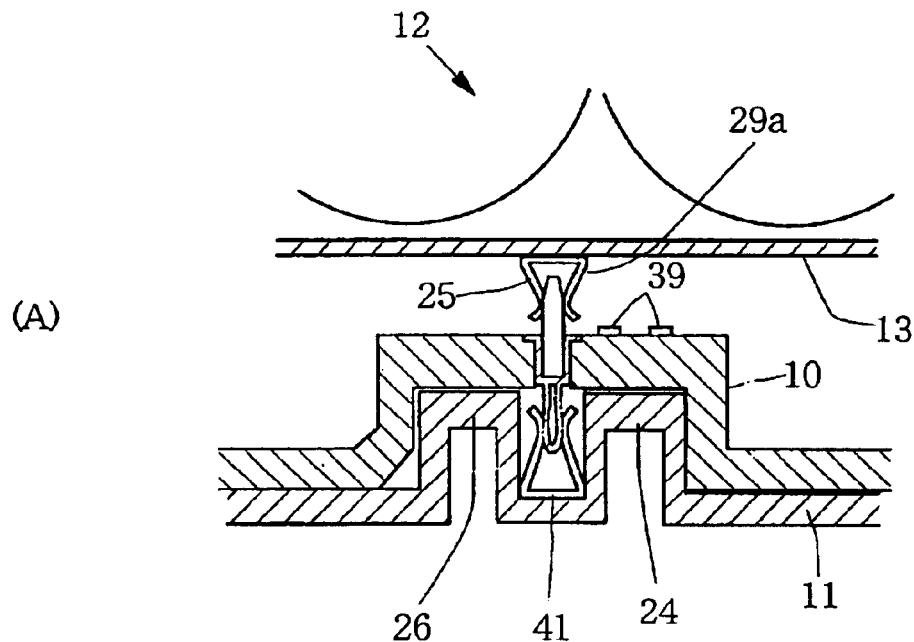
FIG. 7 is a sectional view showing a connection structure of each terminal of the battery.
Figure 7:
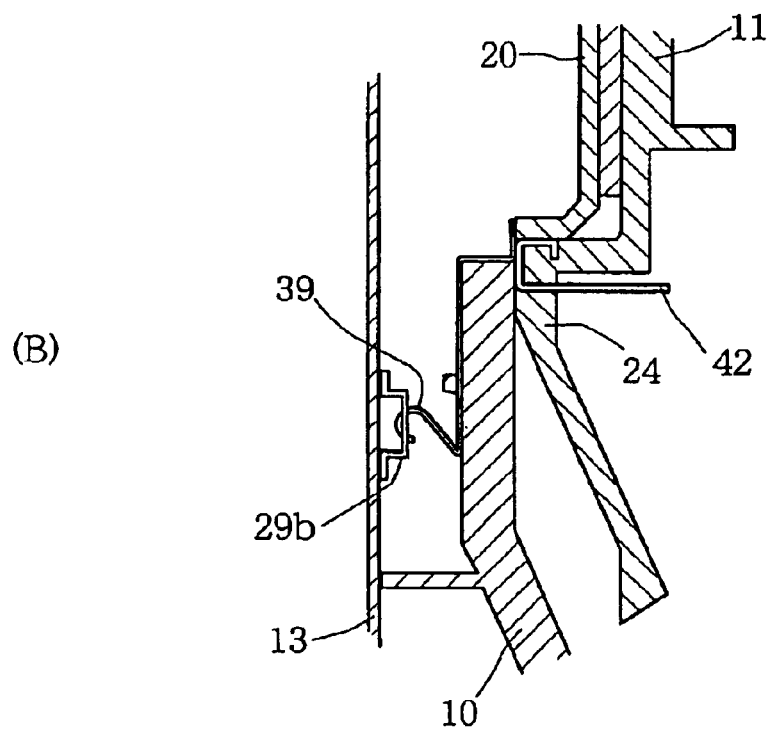

FIG. 7 is a sectional view showing a connection structure of each terminal, and FIG. 7A shows a connection structure of a power source through a power terminal 25, and FIG. 7B shows a connection structure of a signal through the terminals 39. Incidentally, numeral 40 in the drawing is a power terminal provided between the signal terminal parts 24 and the guide projections 26, and numeral 42 is a signal terminal provided in the signal terminal parts 24.

As described above, the battery of the embodiment shown in the drawings can be mounted and dismounted not only to a video camera itself or to an adapter plate mounted in the video camera but also can mount a battery having the same structure and can be mounted to a battery having the same structure. That is, the battery of the embodiment is removable to the video camera itself, the adapter plate or the battery with the same dovetail joint type removable structure as that of the battery of the embodiment shown in the drawings.

Figure 8:
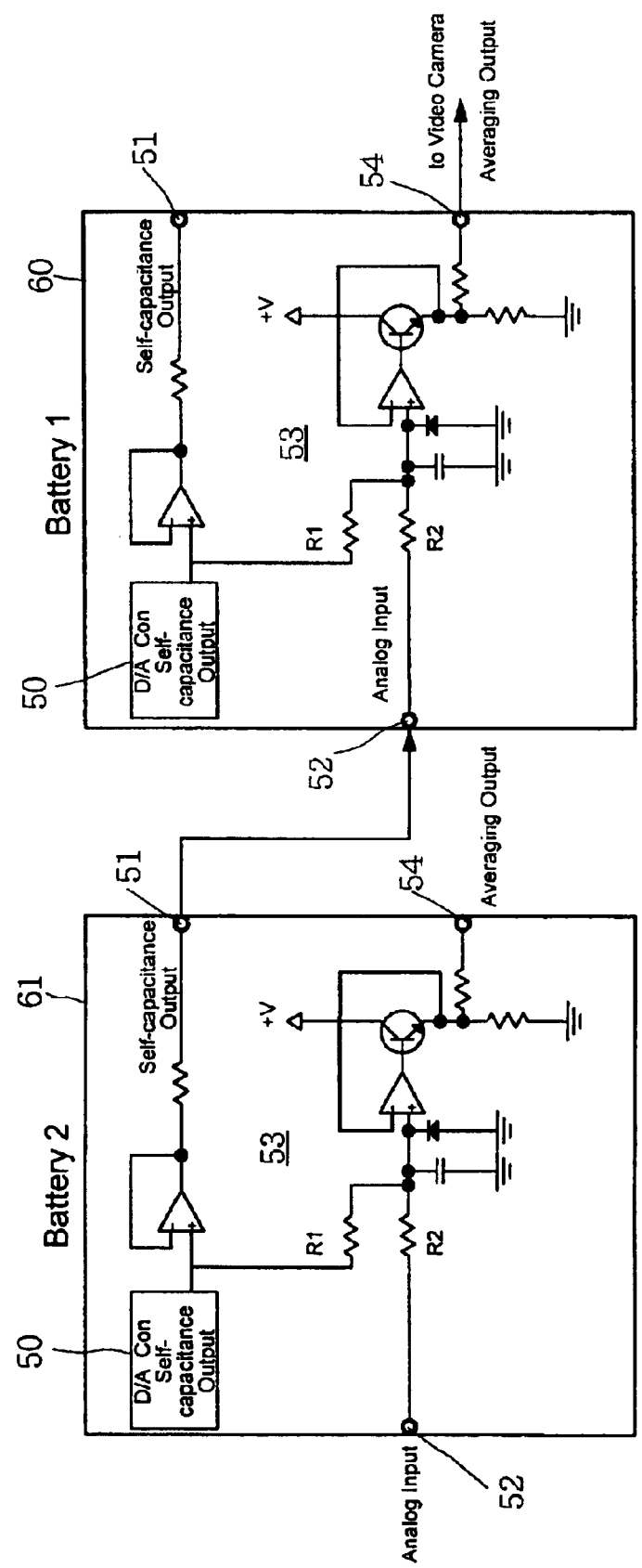
FIG. 8 is a circuit diagram showing one example of an averaging circuit built into the battery.

FIG. 8 is a circuit diagram showing one example of an it averaging circuit built into the battery of the embodiment shown in the drawings. A battery of this kind generally provides a self-capacitance output circuit 50 and a self-capacitance output terminal 51 in order to output the residual capacity to display it on a finder of a video camera, and in addition to them, the battery of the embodiment provides an analog input terminal 52, an averaging circuit 53 and an averaging output terminal 54. These circuits are provided in the substrate 13 and each the terminal is included in the above-mentioned terminal part 27.

The averaging circuit 53 comprises mainly two resistors R1, R2 and an operational amplifier OP. In the case that the self-capacitance output circuit 50 outputs the residual capacity as a battery by an analog voltage of 0 to 5 V, when resistance values of the resistors R1, R2 are same, a middle point voltage of the resistors R1, R2 indicates an averaged value of an output voltage of the self-capacitance output circuit 50 and a voltage showing the residual capacity of another battery inputted from the analog input terminal 52. Also, in the case that absolute capacities of two batteries mounted in the above-mentioned manner are different, when it is assumed that values of the resistors R1, R2 are values according to the capacity of each the battery, a middle point Voltage of the resistors R1, R2 indicates an averaged value of voltages showing the residual capacities of the two batteries. Then, an average value of the residual capacity voltages of the two batteries is outputted from the averaging output terminal 54 of the battery of the side mounted in the video camera itself or the adapter plate, and this value can be handled as if there was an index of the residual capacity outputted from one battery.

Figure 9:
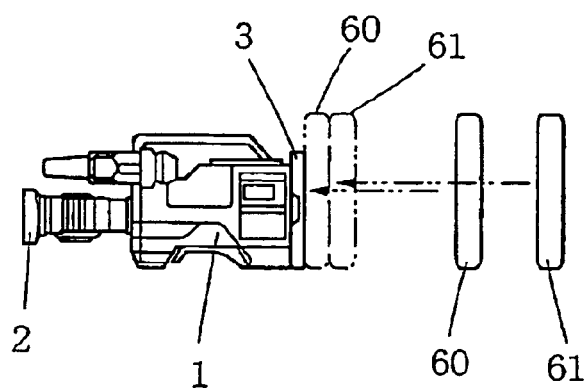
FIG. 9 is a schematic diagram equivalent to FIG. 1 showing an example of mounting two batteries of the embodiment of FIG. 2 in a video camera through an adapter plate.

FIG. 9 is a schematic diagram equivalent to FIG. 1 showing an example of mounting two batteries of the above-mentioned embodiment in a video camera 1 through an adapter plate 3. First, a first battery 60 according to the above-mentioned embodiment of the present invention is mounted in the adapter plate 3 mounted in the video camera 1. In the mounting of this first battery 60 to the adapter plate 3, a fitting plate 16 provided in a recess part 15 of a rear cover 10 is inserted into grooves with a dovetail groove shape (not shown) provided in the adapter plate 3 from the upper direction and is moved down and thus, the first battery 60 is mounted in the adapter plate 3. Next, a fitting plate 16 provided in a rear cover 10 of a second battery 61 is inserted into a recess part 15 of a top cover 11 of the first battery 60 from the upper direction and is moved down in a manner similar to the mounting to the adapter plate 3 and thus, the second battery 61 is mounted in the first battery 60.

Figure 10:
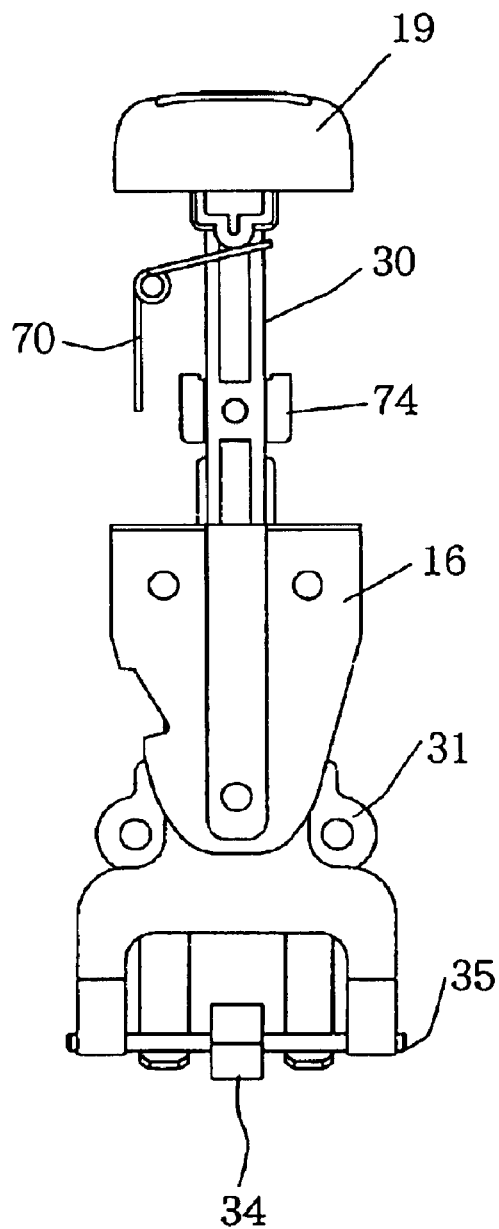
in FIG. 10 is a front view showing another example of a removable structure provided in a rear cover.
Figure 11:
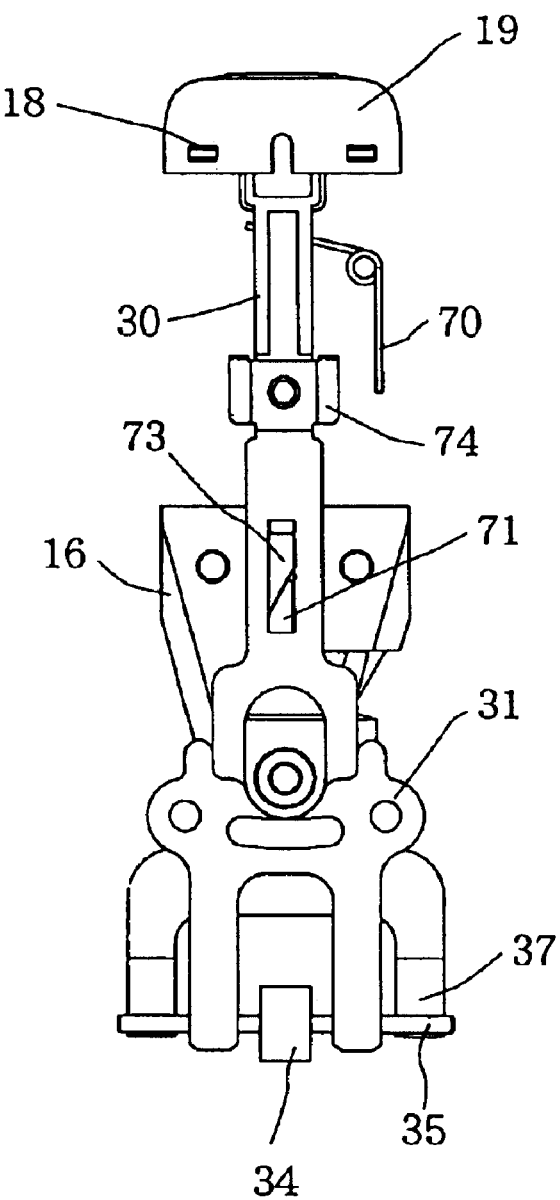
FIG. 11 is a rear view of the removable structure.
Figure 12:
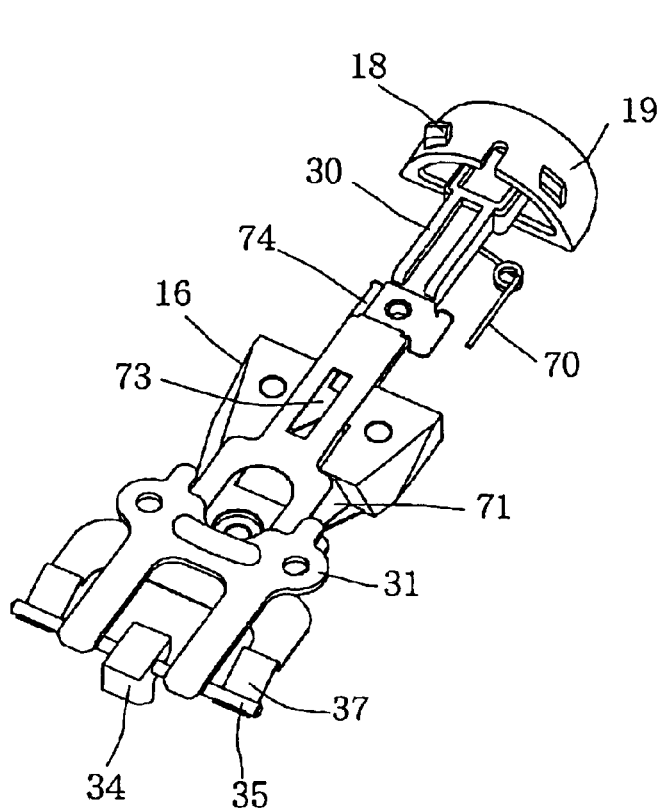
FIG. 12 is a perspective view of the removable structure.
Figure 13:
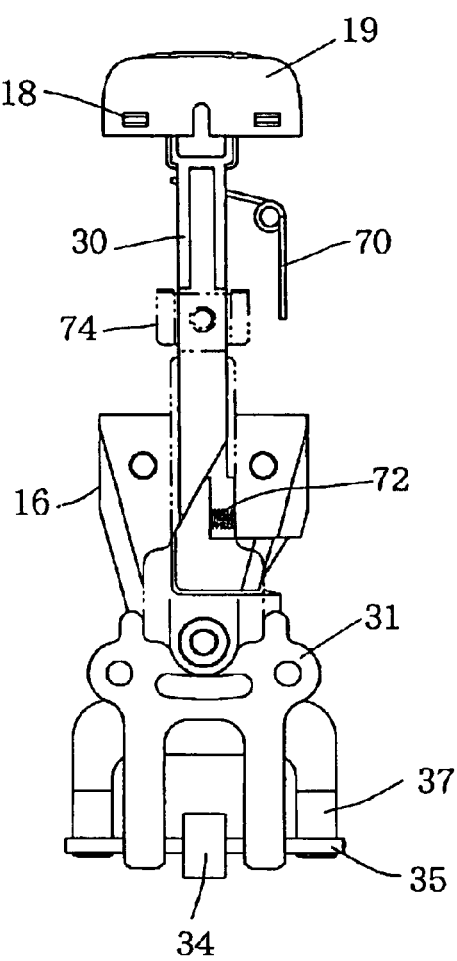
FIG. 13 is a rear view showing operations of the removable structure.

FIG. 10 is a front view showing another example of a removable structure provided in a rear cover 10, and FIG. 11 is a rear view of the removable structure, and FIG. 12 is a perspective view of the removable structure, and FIG. 13 is a rear view showing operations. This removable structure is constructed by using a torsion coil spring 70 instead of the coil spring 33 for energizing a movable member 30 and providing a barrel 71 for release and a small coil spring 72 for pulling and energizing this barrel in a fitting plate 16 within a groove of the fitting plate 16 and mounting a lock release member 73 for moving integrally with the movable member in the movable member 30. Slant portions are respectively formed in the top edge of the barrel 71 for release and the bottom edge of the lock release member 73, and both the portions engage slid ably. Numeral 74 in the drawing it is a connecting member between the movable member 30 and the lock release member 73. Incidentally, this structure has the substantially same structure as the removable structure described previously though there are some differences in shape and structure other than the above-mentioned points.

In this removable structure, when the release button 19 is pushed down against an tenderization force of the torsion coil spring 70, the movable member 30 is also pushed down, and action for the protrusion part 17 for release similar to the structure described previously is formed and also, the lock release member 73 pushes the barrel 71 for release toward the outside of the fitting plate 16 against an tenderization force of the coil spring 72. This barrel 71 for release does not function with respect to a release between the batteries of the present embodiment, but functions with respect to an embodiment having a structure acting from the side of the fitting plate 16 as a structure in which a video camera mounting the battery of the present embodiment releases the battery.

Incidentally, in the above description, the battery according to the present invention has been described as an embodiment used in a video camera, but in addition to the embodiment, it goes without saying that the battery of the present invention can be used in a VTR, an audio recorder, an audio and video editor, audio and video distribution transmitter and receiver, a lighting fixture for interview and so on.

What is claimed is:

1. A battery capable of being removably mounted in a coupling surface of a video camera or in an adapter plate mounted in said coupling surface and capable of being joined to a second battery having a structure corresponding to that of said battery, said battery comprising a front cover and a rear cover and a battery pack enclosed by said covers, said rear cover being provided with a substantially V-shaped recess in its surface, said V-shaped recess having a top portion formed by a V-shaped engagement plate having a dovetail cross-section, and said rear cover being provided with a pair of vertically extending guide grooves provided adjacent outside edges of said rear cover above said V-shaped engagement plate; said front cover being provided with a V-shaped protrusion on its surface corresponding to the V-shaped recess in said rear cover and a pair of guide projections provided adjacent outside edges of said front cover and opposite the guide grooves provided in said rear cover, said guide projections sandwiching a pair of signal terminal parts, said V-shaped protrusion having a V-shaped receiving groove for receiving and forming a dovetail joint with a V-shaped engagement plate of said second battery and corresponding to a V-shaped receiving groove provided in the coupling surface or in the adapter plate mounted in the coupling surface of the video camera to which said battery is to be mounted and said pair of guide projections being adapted to be inserted into said pair of guide grooves.

2. A battery as defined in claim 1, wherein a circuit for outputting a self-capacitance, an input terminal capable of inputting a self-capacitance output from said second battery, and an averaging circuit for averaging an output of the self-capacitance output circuit and an input from the input terminal to produce an output are built into the battery, and wherein a release button and slide covers for covering terminals for electrical connection to an adapter plate mounted in said video camera are provided on a top portion of said rear cover, said slide covers being adapted to engage said signal terminal parts.

* * * * *